MULTIPLE STABLE GENERATORS FOR MAJORITY LOGICAL CIRCUITS

Filed Oct. 25, 1960 5 Sheets-Sheet 1

INVENTOR
HENRI NUSSBAUMER
BY [signature]
ATTORNEY

Nov. 30, 1965 H. NUSSBAUMER 3,221,177

MULTIPLE STABLE GENERATORS FOR MAJORITY LOGICAL CIRCUITS

Filed Oct. 25, 1960

5 Sheets-Sheet 4

United States Patent Office 3,221,177
Patented Nov. 30, 1965

3,221,177
MULTIPLE STABLE GENERATORS FOR MAJORITY LOGICAL CIRCUITS

Henri Nussbaumer, Maisons-Alfort, France, assignor to International Business Machines Corporation, New York, N.Y., a corporation of New York Filed Oct. 25, 1960, Ser. No. 64,873
Claims priority, application France, Nov. 6, 1959, 809,478, Patent 1,248,552
10 Claims. (Cl. 307—88)

This invention relates to logical circuits, and more particularly to logical circuits comprising multiphase stable generator circuits responsive to pulses of a short duration.

A multiphase stable generator circuit in accordance with this invention includes an inductor in series arrangement with a condenser and a pulse generator. When the frequency of pulses supplied from the pulse generator is related to the tuning frequency of the resonant circuit made of the inductor and of the condenser, sinusoidal current generated in the resonant circuit may assume several stable phase states. Accordingly, current generator circuits of the instant type may be used in forming majority logical circuits.

The main object of this invention is to provide a new and novel device having several stable phase states of operation.

Another object of this invention is to provide a new and novel device for generating phase stable signals which may be excited by a pulse generator controlled by signals of a different frequency.

Another object of this invention is to provide a new and novel device for generating phase stable signals which may be excited by a magnetic pulse generator controlled by a sinusoidal current signal of a different frequency.

Another object of this invention is to provide a new and novel device for generating a sinusoidal current signal, the phase of which is determined by a low current signal of a same frequency.

Another object of this invention is to provide devices for generating multiphase stable signals and which, in combination, are suitable for forming logical circuits.

Another object of this invention is to arrange the aforesaid multiphase stable devices in majority logical circuit arrangements.

Other objects of the invention will be pointed out in the following description, and illustrated in the accompanying drawings which disclose, by way of example, the principle of the invention, and the best mode which has been contemplated of applying that principle.

Figure 1:
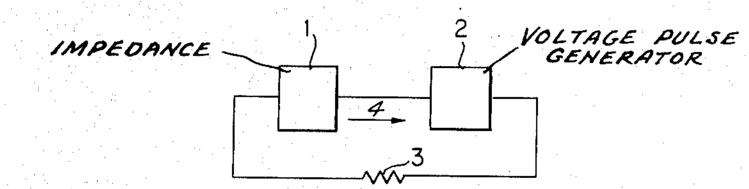
FIGURE 1 is a block diagram of the basic elements of a multiphase stable device in accordance with this invention.

The principle of the invention will be explained with reference to FIGURES 1 and 2. In FIGURE 1, there has been represented under reference 1 an impedance, which, depending upon the current frequency going through it, is low for a sinusoidal current of frequency $2f$ and high for sinusoidal currents of any other frequency; while reference 2 represents a pulse generator with a substantially null impedance voltage, and reference 3 represents a utilization resistance or load of the system. Pulse generator 2 supplies pulses of amplitude $e$ and of a low duration $\theta$ alternately positive and negative, the recurrence frequency of which is $f$, i.e. is such that two pulses of the same polarity are spaced by a time $$T=\frac{1}{f}$$

Figure 2:
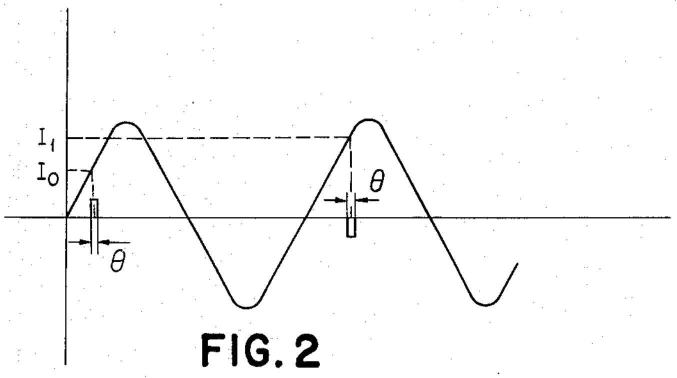
FIGURE 2 is a time diagram to facilitate an understanding of this invention.

Let it be supposed that, at a given instant, the circuit is circulating an A.C. current of frequency $2f$, as represented in FIGURE 2, and that its phase, with respect to the voltage pulses, is such that the pulses occur during the positive alternations of the current. Conventionally, the current is positive when it flows in the direction of arrow 4 in FIGURE 1, and a voltage pulse is positive when it opposes of the current. During the positive pulse, generator 2 absorbs an energy $\int\theta eI_0dt$, and during the negative pulse, provides an energy $\int\theta eI_1dt$. As the pulses are short, it may be supposed that the current has a constant value during the duration of each pulse, i.e. $I_0$ during the positive pulse and $I_1$ during the negative pulse. The energy supplied to the system by the pulses from generator 2 is $\theta e(I_1-I_0)$ and this energy must, for the sinusoidal current to be sustained, compensate the losses in the utilization resistance 3; therefore, the pulses must be in such a position with respect to the current that $I_1$ is higher than $I_0$.

Figure 3:
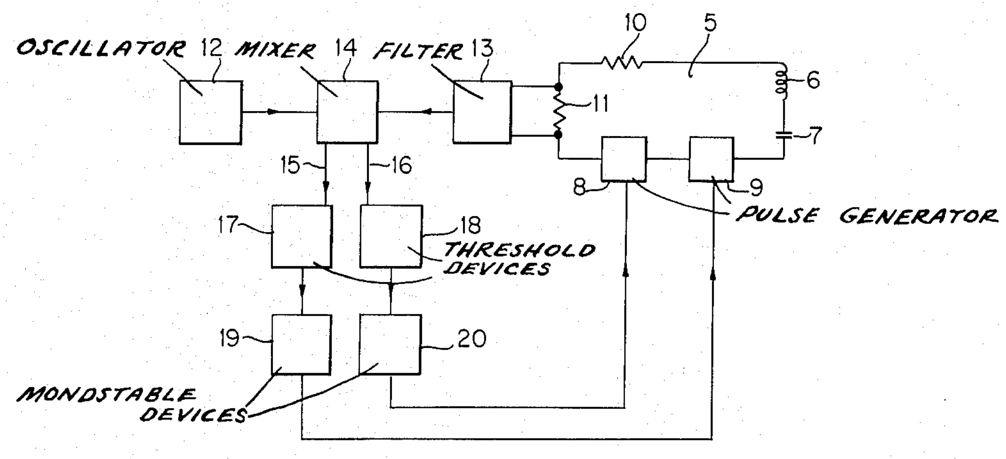
FIGURE 3 is a block diagram of a multiphase stable device for generating signals having either of two opposite phase states.

In FIGURE 3, there is represented a schematic circuit embodying the principles of the invention. Referring to FIGURE 3, reference 5 represents a circuit similar to the basic circuit of FIGURE 1 comprising a resonant circuit tuned at a frequency $2f$ formed by inductance 6 and condenser 7, two pulse generators 8 and 9 with an internal impedance substantially null, and with a load resistance 10. The pulse generator 8 supplies negative pulses and generator 9 positive pulses at a recurrence frequency $f$. These generators are controlled from an oscillator 12 which delivers a sinusoidal voltage at frequency $f$, through circuitry which will be described in connection with FIGURE 4*a* while the circuit 5 has its output delivered to a filter 13.

Figures 4A, 4B:
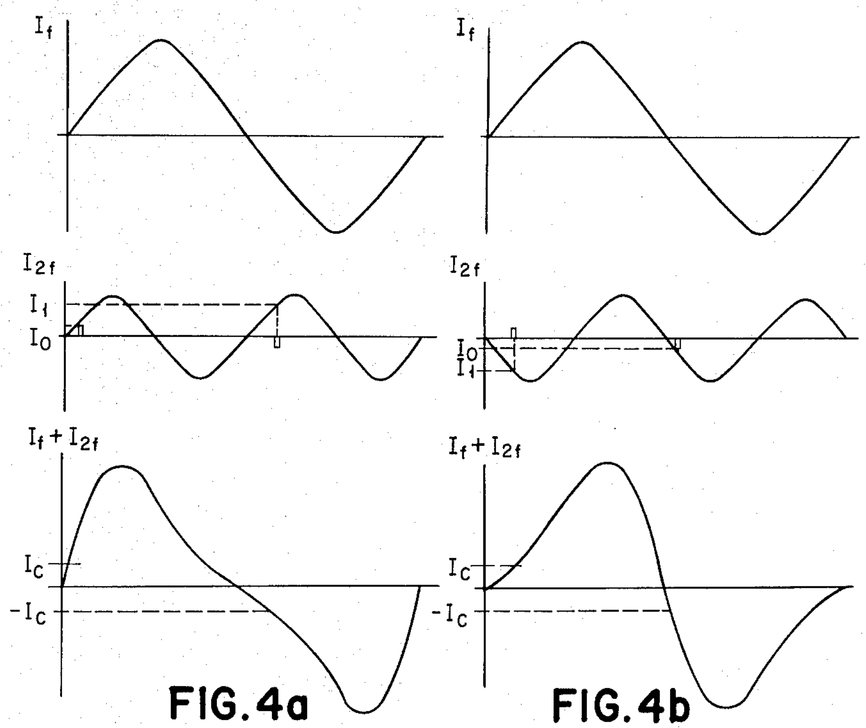
FIGURE 4 is a diagram of the currents in various points of the circuit.

Let it be supposed that the output voltage of generator 12 and the current circulating in circuit 5 have a wave form as indicated in the two upper curves of FIGURE 4*a*. Across resistance 11, there is a voltage which is in phase with the current flowing through circuit 5. Mixing circuit 14, therefore, receives two sinusoidal voltages, the first having a frequency $f$ from oscillator 12 and the other having a frequency $2f$ from the circuit 5 through filter 13, respectively. The voltage appearing along leads 15 and 16 of mixing circuit 14 is the sum of the two above mentioned voltages, the shape of which with respect to time is given by the lower curve of FIGURE 4*a*. Connected to the outputs 15 and 16 are threshold devices 17 and 18, respectively, of any type known in the art which control the operation of two conventional monostable devices 19 and 20. Device 17 has a positive threshold and device 18 has a negative threshold. When the voltage on conductor 15 exceeds the positive threshold voltage of device 17, monostable device 19 supplies a pulse of duration $\theta$. Similarly, when the voltage on conductor 16 decreases below the negative threshold voltage of device 18, monostable device 20 supplies a pulse of duration $\theta$ equal to the first one. In the represented circuit, the thresholds of devices 17 and 18 have the same absolute value. Therefore, considering the lower curve of FIGURE 4*a*, monostable devices 19 and 20 are operative in the course of two consecutive periods of the sinusoidal current of frequency $2f$ flowing in circuit 5 and that, moreover, within each period, monostable device 19 operates prior to monostable device 20. The output pulses of monostable devices 19 and 20 are transformed by generators 9 and 8, respectively, into positive and negative pulses with a low impedance and, as their positions in time are those of the starts of threshold devices 17 and 18 described above, they can sustain the sinusoidal current of frequency $2f$ shown in the center curve of FIGURE 4*a* in the circuit 5.

Referring now to FIGURE 4*b*, it is seen that there might exist, together with the same sinusoidal voltage of frequency $f$ delivered by generator 12, a sinusoidal voltage of frequency $2f$ in a circuit 5 but with its phase opposed to the phase of the current of frequency $2f$ which circulated in circuit 5 under the conditions of FIGURE 4*a*; in such a case, it is the negative pulses which absorb energy and the positive pulses which supply it. Circuit 5 may, therefore, circulate a sinusoidal current of frequency $2f$ sustained by the voltage generator 12 of frequency $f$, and liable to assume either of two opposite stable phases.

Figure 5:
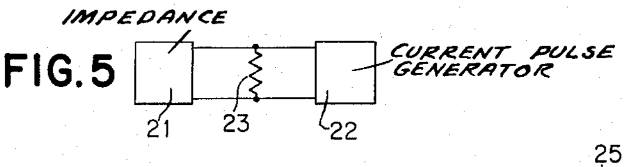
FIGURE 5 represents the diagram shown in FIGURE 1 modified by duality.

FIGURE 5 shows a basic diagram of the circuits embodying the principles of the invention, said circuits being a modification by duality of the basic circuits shown in FIGURE 1. Block 21 represents an impedance depending upon the current going through it, which is very high for a sinusoidal current of frequency $2f$ and low for sinusoidal currents of any other frequency; block 22 is a current pulse generator with a high internal impedance and 23 a utilization resistance. Generator 22 supplies current pulses alternately positive and negative, the positions in time of which are the same as those of the pulses supplied by generator 2, FIGURE 1. It is easily seen, by an argument similar to that concerning FIGURE 1, that a sinusoidal voltage of frequency $2f$ may be sustained at the terminals of impedance 21, and one may refer for that argument to FIGURE 2, interchanging the words current and voltage.

Figure 6:
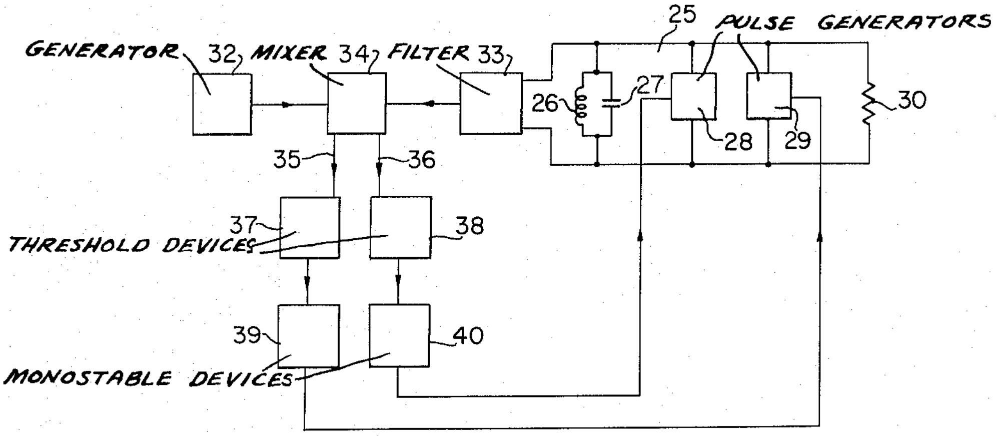
FIGURE 6 represents the diagram of FIGURE 3 modified by duality.

The block circuit of FIGURE 6 is a circuit modified by duality from that of FIGURE 3. It comprises, on one hand, a circuit 25 comprising a selective impedance supplied by an antiresonant circuit tuned to the frequency $2f$ and composed of an inductance 26 and a condenser 27, two high impedance current pulse generators 28 and 29 which deliver negative and positive pulses respectively and a utilization resistance 30. The current pulses of frequency $f$ are supplied by voltage generator 32 by means of a mixer 34, positive and negative threshold devices 37 and 38, and monostable devices 39 and 40; which have exactly the same function as mixers 14, threshold devices 17 and 18 and monostable devices 19 and 20, respectively, FIGURE 3. Here again, with reference to FIGURES 4*a* and 4*b*, it may be seen that, at the terminals of the antiresonant circuit 26–27 and of the utilization resistance 30, a sinusoidal voltage of frequency $2f$ is sustained by pulses of frequency $f$, and may assume either of two opposite phase states.

Figure 7:
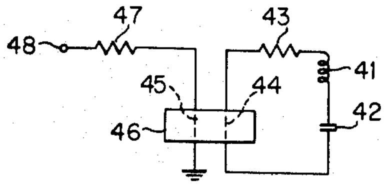
FIGURE 7 is a diagram of a multiphase stable device in accordance with the invention employing a magnetic core.
Figure 8:
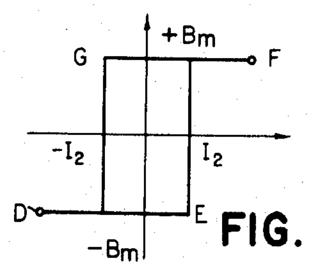
FIGURE 8 is a diagram of the induction with respect to the field of a magnetic core having a rectangular hysteresis cycle.

FIGURE 7 shows the diagram of a simple device embodying the principles of the invention. The basic circuit of FIGURE 1 comprises the resonant circuit tuned to frequency $2f$ formed of an inductance 41 and a condenser 42, a utilization resistance 43 and a pulse generator formed of a winding 44 around a core 46 made of magnetic material exhibiting a rectangular hysteresis cycle. Coupling the core 46 is another winding 45 having one end connected to ground and the other to a resistor 47 having terminal 48. The terminal 48 is energized by a frequency $f$ sinusoidal current generator (unshown). Core 46 acts as mixer 14, threshold devices 17 and 18 and monostable devices 19 and 20. In effect, currents $i_1$ and $i_2$ circulating in windings 45 and 44, respectively, produce in core 46 a magnetic field proportional to $n_1i_1+n_2i_2$ where $n_1$ and $n_2$ are the respective numbers of turns of windings 45 and 44. If $I_c$ is the current which, if it passed through one turn coiled around core 46, produces a field equal to the coercive force of core 46, it is seen that this core functions as a threshold device. Let it be assumed that the core 46, at a given instant, is in a saturation state represented by a point D in FIGURE 8, i.e. with an induction $-B_m$; then, currents $i_1$ and $i_2$ are such that $n_1i_1+n_2i_2$ is negative. When the field increases at the same time as $n_1i_1+n_2i_2$, it will reach zero and become positive along an arm DE of the hysteresis cycle. At point E, defined by $n_1i_1+n_2i_2=I_c$, the field is equal to the coercive force of core 46 and the core is switched, i.e. its induction goes from $-B_m$ to $+B_m$, and the state of the core moves towards a point F. Thereafter, the field will decrease, and when the core is in a state represented by a point G., i.e. when the negative coercive force is reached, the core is switched again to come to a state represented by a point D and its induction passes from $+B_m$ to $-B_m$. Thus, for the mixing function $n_1i_1+n_2i_2$, there are two thresholds of action, one being positive and the other one negative, defined by value $I_c$. During each of these switchings, an alternating voltage is developed across winding 44 having a value $e_2$, defined by $$\frac{e_2}{n_2}=\frac{e_1}{n_1}$$

if $e_1$ is the electromotive force developed across winding 45, which is a function of the elements of circuit 44–45 and of the voltage applied to terminal 48. The duration of each of the voltage pulses is defined by $$e_1=n_1\frac{d\phi}{dt}10^{-8}$$

i.e.

$$\theta=10^{-8}\int\frac{n_1}{e_1}d\phi$$

which, if the switching is quick and the voltage is constant during the switching, gives $$\theta=10^{-8}\frac{n_1}{e_1}\Delta\phi$$

From the above, it is seen that the circuit of FIGURE 7 operates as does circuit shown in FIGURE 3, and that, consequently, by connecting to terminal 48 sinusoidal voltages of frequency $f$, a sinusoidal voltage of frequency $2f$, which may assume either of two opposite phase states is sustained in circuit 41, 42, 43, and 44.

Figure 9:
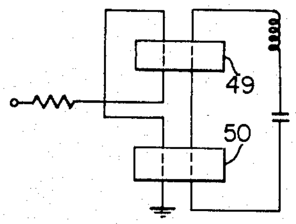
FIGURES 9 to 12 represent symmetrical devices including magnetic cores for generating a current which may assume either of two opposite phase states.

Various other cricuits may be formed in accordance with the principles of the invention as, for example, the circuits of FIGURES 9 through 12. These circuits are symmetrical set-ups providing a more reliable operation. In the circuit of FIGURE 9, which is a modification of FIGURE 7, two cores 49 and 50 function as two pulse generators for the circuit tuned to frequency $2f$ and, because of the connections between the windings along which current flows at frequency $f$, the fields within the cores are set as if the current at the frequency $2f$ had a phase for one of the cores and the opposite phase for the other. If one examines FIGURES 4*a* and 4*b*, it is seen that the active pulse, in one case as in the other, occurs during the alternation of the current of frequency $f$, the beginning of which is opposite to the current of frequency $2f$. With the connections indicated, an active pulse appears for each period of the current of frequency $2f$.

Figure 10:
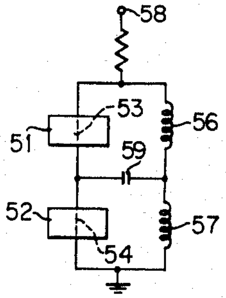
Figure 11:
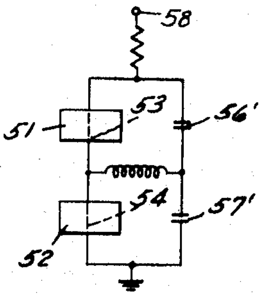
Figure 12:
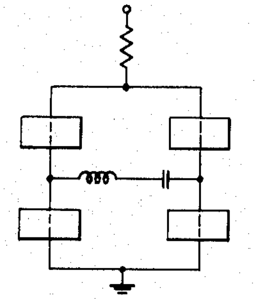

FIGURES 10, 11 and 12 show circuits wherein one uses cores formed of a magnetic material exhibiting a rectangular hysteresis cycle and wherein the mixing effect is obtained by addition of the currents in the windings, and not by addition of the fields. In the circuit of FIGURE 10, for example, I is the current of frequency $f$ which flows in windings 53 and 54 coiled around the cores 51 and 52 when a sinusoidal voltage of frequency $f$ is applied to terminal 58 and $i_1$ and $i_2$ are currents of frequency $2f$ which circulate at a given instant in inductances 56 and 57 and through condenser 59. Both currents $i_1$ and $i_2$ are always such that $i_1$ and $i_2$ are in phase in the branch comprising the condenser 59; it is seen that winding 53 carries a current $I \pm i_1$ and that winding 54 carries a current $I - i_2$. If the two loops are identical, $i_1$ and $i_2$ are equal and the circuit operates as that of FIGURE 9. The current in condenser 59 receives active pulses on each period, and may assume either of two opposite stable phases. The phases are the same for each loop because of the coupling produced by the condenser 59.

The circuit of FIGURE 11 is the same as that of FIGURE 10 when inductance 59' is substituted for condenser 59 and condensers 56' and 57' are substituted for inductances 56 and 57, respectively. Also, circuit of FIGURE 12 is perfectly symmetrical and its operation is similar to that of the circuits of FIGURES 10 and 11.

The circuits shown in FIGURES 10 and 11 and 12 may be achieved as follows. In FIGURE 10, for example, winding 53 may be made of a rectilinear conductor and core 51 of a coating of a magnetic material exhibiting a rectangular hysteresis cycle and formed by an electrolytic deposit, or of any other coating process well known in the art. The charge or utilization resistance is included in all cases in the branch common to the two loops carrying the current of frequency $2f$.

Figure 13:
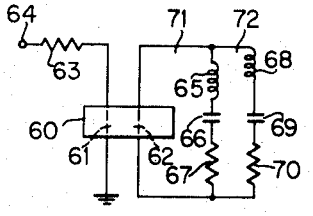
FIGURE 13 illustrates a device which may assume either of two phase states and which is sustained by pulses having a frequency which is a sub-harmonic of the sustained signals.

FIGURE 13 represents a component circuit from which may be derived a whole range of circuits similar to the circuits of FIGURES 9 to 12 which were derived from the basic circuit of FIGURE 7. The circuit comprises a core 60 of a magnetic material exhibiting a rectangular hysteresis cycle having two windings 61 and 62. A generator (unshown) energizes a terminal 64 with a sinusoidal voltage of frequency $f$ which feeds a circuit formed of resistor 63 and winding 61. A secondary circuit includes two loops 71 and 72 formed of winding 62, inductance 65, condenser 66 and resistance 67 (loop 71), and winding 62, inductance 68, condenser 69 and resistance 70 (loop 72). Winding 62, therefore, carries a current which is the sum of the currents in the two loops 71 and 72, and the field produced is added to the sinusoidal field of frequency $f$ produced by current along winding 61 whereby oscillations are sustained in loops 71 and 72. If it is assumed that the resonant circuits 65, 66 and 68, 69 are tuned to one of the frequencies $f_1$ and $f_2$ respectively, so that $f_1+f_2=2f$, the currents in each of the loops will have the frequencies $f_1$ and $f_2$, respectively, and the current resulting in winding 62 represents a current of frequency $$\frac{f_1+f_2}{2}=f$$

modulated at frequency $$\frac{f_1-f_2}{2}$$

and the field in core 60 is an A.C. field of frequency $f$ modulated at frequency $$\frac{f_1-f_2}{2}$$

Because of the modulation, the instant of the switching in each alternation of the field occurs at a different moment and oscillations of frequency $f_1$ and $f_2$ are sustained in loops 71 and 72.

It may also be shown that the secondary circuit in the device of FIGURE 7 may carry a sinusoidal stable current, the frequency of which is any harmonic of the frequency of the voltage applied to terminal 48 provided the resonant circuit 41–42 is tuned to the corresponding frequency. In particular, if the resonant circuit is tuned to frequency $3f$, the current circulating therein may assume one of three stable phases.

It may also be shown that the secondary circuit, in a symmetrical set-up such as that of FIGURE 9, for example, may support a sinusoidal current, the frequency of which is that of the supplying current and which may assume either of two opposite stable phases.

It is to be remarked that the Q factor of the resonant circuit does not affect maintenance of the oscillations. The basic devices described above may therefore operate with resonant circuits with a low Q-factor and a part of the energy of the tuned circuit may be used to operate switching circuits or logical circuits such as those described herebelow.

Figure 16:
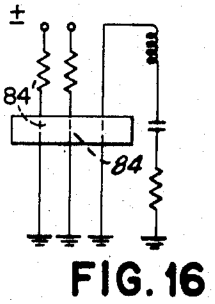
FIGURE 16 illustrates a multiphase stable device wherein the phase states are controlled by a D.C. current.
Figure 14:
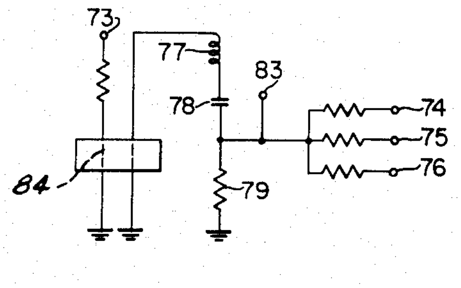
FIGURES 14 and 15 illustrate a majority circuit embodying the principles of this invention.
Figure 15:
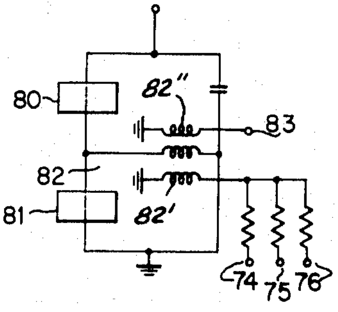

The circuit of FIGURE 14 represents a majority circuit based upon the principle indicated above. When a sinusoidal voltage of frequency $f$ is initially applied to terminal 73 and along winding 84, a sinusoidal voltage of frequency $2f$ in either of two opposite phases can be selectively sustained in the resonant circuit 77–78. There is a delay at the start which may be important, the current setting only if a phase may prevail because of slight dissymmetries in the system. The result is that, if the sinusoidal voltage of frequency $f$ is applied to terminal 73 but during a short time, during 10 to 20 periods, for example, of the voltage at frequency $f$, no substantial current flows in the resonant circuit. But if, at the same time terminal 73 is applied the voltage of frequency $f$, one or more of terminals 74, 75 or 76, is applied a voltage of frequency $2f$ of a very low amplitude and presenting one of the two possible stable phases of the current which must flow in the resonant circuit, the latter is set rapidly having a corresponding phase and a large amplitude. The output signal is available at terminal 83. There have been often observed gains around 1000 between the amplitude of the control voltage at frequency $2f$ measured across resistance 79 and the amplitude of the voltage available across resistance 79 when the current is set in the secondary circuit of the cell. FIGURE 15 shows another majority circuit which can be formed by leads coated with a magnetic material as represented by 80 and 81, and the control voltage is applied to a second winding 82' of the tuning inductance 82, the output voltage is then available on terminal 83 connected to a third winding 82'' of the tuning inductance. In the device of FIGURE 16, which is a modification of FIGURE 14, one of the phases is favored by application to an additional winding 84' of a D.C. current in one direction or in another to alter the value of the A.C. current for which the coercive force is reached, so as to favor a particular phase with respect to the other. Referring also to FIGURES 14 and 15, it is seen that if a voltage of frequency $f$ is applied to terminal 73 and voltages of frequencies $2f$ and of equal amplitudes are applied to terminals 74, 75 and 76 concurrently, it is seen that the phase of the current flowing in the tuned circuit and consequently available either on resistor 79 or at terminal 83 will be the phase present on the majority of terminals 74, 75 and 76.

The devices of FIGURES 14 and 15 are adaptable as two-input AND and OR logical circuits. In fact, let it be supposed that, by definition, one of the phases of the current of frequency $2f$, i.e. phase A, represents a logical 1 and that the opposite phase, or phase B, represents a logical 0. An AND circuit is had by applying phase B to one of terminals 74 to 76. In such a case, for the circuit to provide a binary "1," i.e. for the current at frequency $2f$ which circulates in the resonant circuit to assume phase A, it is necessary that at least two of the input terminals be provided with Phase A, i.e. the two input terminals other than the terminal receiving the reference phase should receive a logical "1." Conversely, to provide an OR circuit, one of the terminals must be applied reference phase A. In such a case, there will be a "1" or a current of phase A in the resonant circuit if at least two of the terminals are applied phase A. As the reference terminal is already applied phase A, it is necessary that at least one of the free terminals be supplied with phase A.

To form an inverting circuit, it will suffice to take the device of FIGURE 15 and invert the connections with the third winding 82'' of inductance 82 or, alternatively, to use the device of FIGURE 14 and substitute an inverting transformer in lieu of resistance 79, input signals to both devices are being supplied through one of the inputs 74, 75, or 76.

Figure 17:
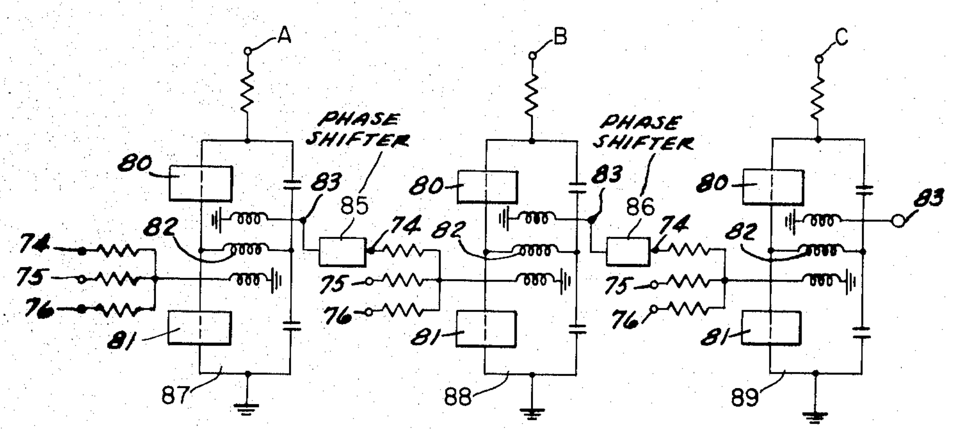
FIGURES 17 and 19 represent two cell coupling modes according to the invention for realizing complex logical circuit.
Figure 18:
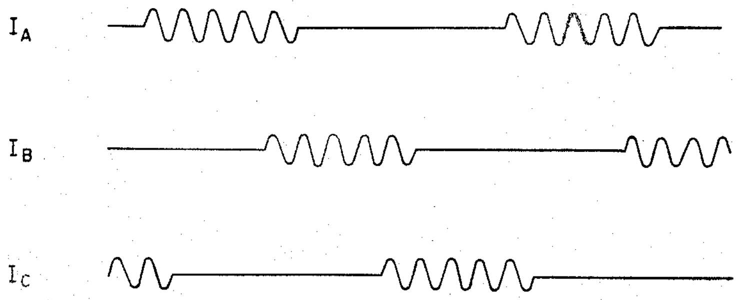
FIGURE 18 shows the feed current diagrams of a complex logical circuit.

It is possible to cascade several devices such as those represented in FIGURES 14 and 15, so as to obtain complex logical circuits. To this purpose, the output terminal 83 of a device such as shown in FIGURE 15 is connected to a terminal such as 74 of the following device. The resistor shown as connected to each of terminals 74, 75 and 76 may be important, for, as indicated above, a very low amplitude of the control voltage is necessary to get a substantial output voltage. Thus, one gets devices such as those of FIGURE 17: in this device, there are shown phase shifting networks 85 and 86, the function of which will be explained in detail now. Each circuit cell 87, 88 and 89 can feed in parallel a number of cells, since a small part of the energy derving from a cell is sufficient to feed another one. Cells mounted in parallel at the output of a cell, however, may feed energy back to the cell controlling them through the output transformer so as to modify the phase of such cell. The problem has been solved by shifting in time the supply operations. In a complex circuit, comprising a great number of cascaded stages, the cells are distributed in three groups. Group A comprising the cells of stages 1, 4, 7, etc. . . . ; group B comprising the cells of stages 2, 5, 8, etc. . . . ; group C comprising the cells of stages 3, 6, 9, etc. . . . . These groups of cells are supplied with currents of frequency $f$ indicated as $I_A$, $I_B$, $I_C$, respectively, in FIGURE 18. These currents are cut in equal wave trains from a same sinusoidal current generator. The number of periods in each train is not necessarily that of the figure, but it is determined by the correct operation of the circuits (from 10 to 20 for example). The cutting of each current is such that the first train $I_B$ starts before the end of the first train $I_A$, the first train $I_C$ before the end of the first train $I_B$, and the second train $I_A$ before the end of first train $I_C$, and so on . . . . The chain operates then in the following way: the input conditions are present at the inputs 74, 75, and 76 of the first cell A before the first rain $I_A$ starts. As soon as the latter starts, the cell delivers an output current of frequency $2f$ and of the desired phase which is applied to input 74 of following cell B. This current from the first cell A, as well as from those which are connected in parallel to the other inputs 75 and 76 of cell B, are without influence over the latter before the arrival of the first train $I_B$. At that moment only, cell B delivers an ouput current of frequency $2f$ and of suitable phase. The latter does not affect the preceding cell A since the current is set as long as the first train $I_A$ lasts. The operations are the same for cell C at the arrival of the first train $I_C$. It may occur at that moment that other conditions should be applied to the terminals 74, 75 and 76 of the first cell A. When the current is set in cell C, because of the parallel condition of several cells C, a current may be sent to the transformer 82 of cell B resulting in a current which assumes one phase or the other in the transformer of cell A which could alter the phase of the current which will flow in cell A on the arrival of the second train $I_A$. Therefore, there has been provided phase shifter 86 to phase shift the back current in cell B by $\pi/4$ and another identical phase shifter 85 so that the resulting current in the transformer of cell A is in time-quadrature with the currents providing the input conditions. Therefore, as current in quadrature cannot alter the phase of the cell current resulting from the input conditions and from the back current be related as 0 and $\pi/2$ or $\pi/2$ and $\pi$, which suffices to determine the phase of the current flowing in cell A on the arrival of the second train $I_A$. It is well understood that the phase shifting devices are inserted in all the coupling paths.

Figure 19:
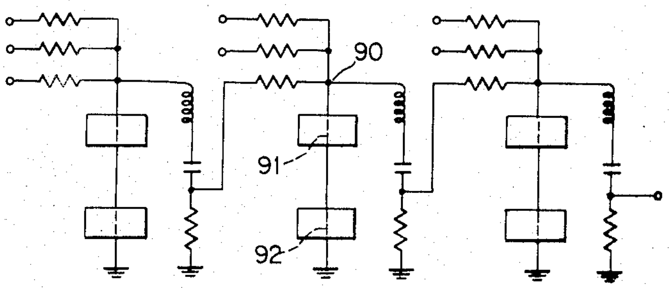

Another complex logical circuit using the principles of the invention is shown in FIGURE 19. In that device, there have been represented cells substantially of the type shown in FIGURE 9 without showing the frequency $f$ feeding circuit. The cells of each stage are still classified as cells A, B and C in the same way as the cells of the device of FIGURE 17 and are fed by currents $I_A$, $I_B$, $I_C$, of frequency $f$ represented in FIGURE 18. As for the preceding device, there is no risk of back coupling from one stage to the preceding one. The voltage of frequency $2f$ which produces the current favoring one of the possible phases of the current circulating in the resonant circuit may be injected in any point of the circuit. In this disposition, it is injected across the terminals of the windings around the magnetic cores 49 and 50. If a cell C delivers a current during the existence of current $I_C$, it feeds a current back to a cell B, which is ineffective so long as cell B is supplying. But after the interruption of current $I_B$, the current from the back coupling circulating in cell B does not produce a voltage drop between point 90 and ground as this current is less than the current necessary to produce the coercive field in the cores and, consequently, both windings 91 and 92 have a null impedance for that current. As no voltage is present at point 90 immediately before the appearance of currenct $I_A$, no current is fed back to cell A. This coupling mode may also be made with cells of the type shown in FIGURE 11, with an identical coupling to the terminals of a winding coiled around a magnetic core.

Figure 20:
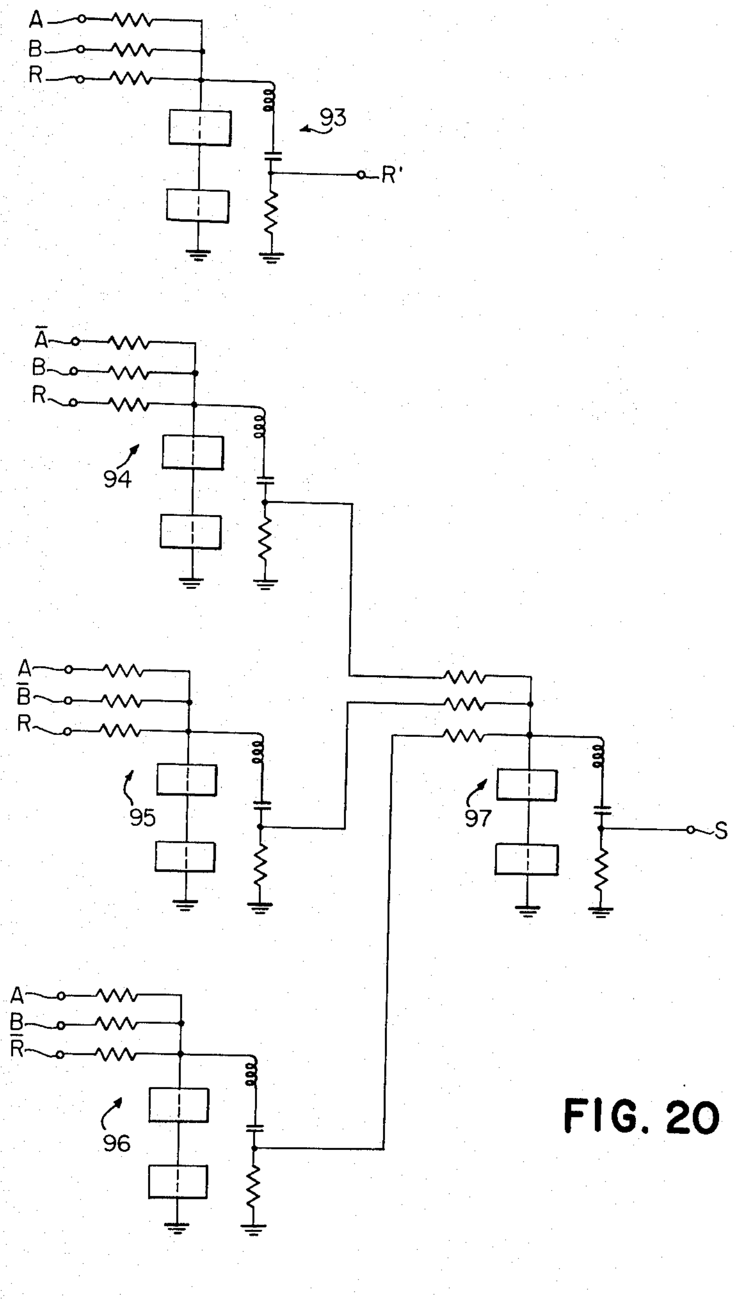
FIGURE 20 illustrates a binary adding stage comprising multiphase stable devices according to the invention.

FIGURE 20 represents an adding stage comprising cells substantially of the type shown in FIGURE 9. It is supposed that, for each stage, there are two binary elements to be added, A and B, their inverses $\overline{A}$ and $\overline{B}$ and the carry from the preceding stage R and its inverse $\overline{R}$. One single cell 93 generates carry R', for the latter is equal to "1" if at least two of quantities A, B and R are equal to "1," and is simply a majority circuit. The sum S is obtained in two steps, as follows: the first stage comprises three cells fed each with two of quantities A, B, R, and the inverse of the third one. It results in that, if A, B and R are null or all equal to "1," each cell 94, 95, 96 with two inputs of the same phase, "0" or "1," respectively, have an output representing a "0" or a "1". If two of quantities A, B and R are null, the third one, A for example, beingn equal to "1," cell 94 fed by $\overline{A}$, B and R has three null inputs and delivers a "0," whereas the two cells 95 and 96 which have but one null input deliver a "1," and cell 97, with two inputs equal to "1," provides a "1" on output S. Finally, if two of quantities A, B or R are equal to "1," the third one, A for example, being null, only cell 94 provides a "1" on its output, since its three inputs are equal to "1"; the other two cells 95 and 96 have two "0's" at their inputs and therefore provide a "0" at their outputs, and cell 97 with two null inputs provides a "0" to output S. Therefore, the result is actually the binary sum of the three quantities A, B and R, which is equal to "1," if, and only if, either of the three quantities A, B and R are equal to "1," or only one of A, B or R is equal to "1."

While the invention has been particularly shown and described with reference to preferred embodiments thereof, it will be understood by those skilled in the art that various changes in form and details may be made therein without departing from the spirit and scope of the invention.

What is claimed is:

1. A multiphase stable apparatus comprising, a circuit tuned to resonate at a given frequency, generator means for providing a sequence of pulses of alternating polarity whose recurrence frequency is a submultiple of said given frequency, said generator means sustaining a current at said given frequency exhibiting one of a plurality of different phases, the phase of the current sustained in said circuit being dependent upon a predetermined timing of the pulses from said generator means, and means intercoupling said generator means and said circuit for relating the phase of the current sustained in said circuit and the timing of the pulses from said generating means.

2. Apparatus as set forth in claim 1 wherein said circuit is tuned to resonate at a frequently $2f$ and the recurrence frequency of said pulses is $f$.

3. Apparatus capable of sustaining different stable states of operation comprising; a circuit tuned to resonate at a given frequency and sustain a current at said given frequency which exhibits one of a plurality of different phases; a source of sinusoidal signals having a frequency which is a submultiple of said given frequency; means comprising positive and negative threshold devices for mixing signals from said source and said circuit to provide a sequence of pulses of alternating polarity having a recurrence frequency equal to the frequency of said source; said circuit being responsive to said mixing means to resonate and sustain a current at said given frequency whose phase is dependent upon a predetermined timing of said pulses; and means intercoupling said mixing means and said circuit.

4. Apparatus capable of sustaining different stable states of operation comprising; a circuit tuned to resonate at a given frequency and sustain a current at said given frequency exhibiting one of a plurality of different phases; a source of sinusoidal signals having a recurrence frequency which is a submultiple of said given frequency; means for mixing signals from said source and from said circuit to provide a sequence of alternating polarity and pulses having a recurrence frequency equal to the frequency of said source; said circuit being responsive to said mixing means to resonate and sustain a current at said given frequency and in said one phase; and means intercoupling said mixing means and said circuit for relating the timing of the pulses from said mixing means and the phase of the current sustained in said circuit.

5. Apparatus capable of sustaining different stable states of operation comprising, a circuit tuned to resonate at a given frequency, said circuit responsive to a sequence of pulses having a recurrence frequency which is a submultiple of said given frequency to resonate and sustain a current at said given frequency in one of a plurality of different phases, the phase of the current sustained in said circuit being dependent upon the timing interval between said pulses of alternating polarity, a source of sinusoidal signals having a recurrence frequency which is a subharmonic of said given frequency, and means comprising a magnetic element made of material exhibiting a rectangular hysteresis characteristic intercoupling said source and said circuit to provide said sequence of pulses to said circuit and interdependently relate the timing interval between said pulses of alternating polarity and the phase of the current sustained in said circuit.

6. Apparatus as set forth in claim 5, wherein said magnetic element is an annular core.

7. Apparatus comprising a first and a second circuit connected and tuned to resonate in parallel, said first circuit tuned to resonate and sustain a current wave having a first frequency of repetition, said second circuit tuned to resonate and sustain a current wave having a second frequency of repetition, the sum of the currents sustained in said first and second circuits being a predetermined frequency and exhibiting one of a plurality of different phases, a source for providing a sequence of pulses of alternating polarity whose recurrence frequency is a submultiple of said predetermined frequency, and means intercoupling said source and said parallel connected circuits for interdependently relating the phase of the sum current sustained in said circuits and timing interval of the pulses from said source.

8. Apparatus comprising a first and a second circuit connected and tuned to resonate in parallel, said first circuit tuned to resonate and sustain a current wave of frequency $f_1$; said second circuit tuned to resonate and sustain a current wave of frequency $f_2$; said circuits connected to sustain a sum current wave having a frequency $f_1+f_2$ exhibiting one of a plurality of different phases; said connected circuits responsive to a sequence of alternate polarity pulses having a recurrence frequency of $f_1+f_2/n$, where $n$ is an integer, to resonate and sustain the sum current wave of frequency $f_1+f_2$ exhibiting a selected phase dependent upon a predetermined timing of said pulses with respect to a reference phase; a source for providing a current wave of frequency $f_1+f_2/n$; and means intercoupling said source and said connected circuits for both providing said sequence of pulses and interdependently relating the phase of the sum current sustained in said connected circuits and the timing of said pulses.

9. Apparatus as set forth in claim 8, wherein said means intercoupling said source and said connected circuits comprises a threshold device.

10. Apparatus as set forth in claim 9, wherein said threshold device comprises a magnetic element made of material exhibiting a rectangular hysteresis characteristic.

References Cited by the Examiner

UNITED STATES PATENTS

| | | | |
|---|---|---|---|
| 2,815,488 | 12/1957 | Von Neumann | 307—88 |
| 2,927,260 | 3/1960 | Prywes | 307—88 |
| 2,928,053 | 3/1960 | Zeniti Kiyasu et al. | 307—88 |
| 2,948,818 | 8/1960 | Goto | 307—88 |
| 2,948,819 | 8/1960 | Goto | 307—88 |
| 3,084,264 | 4/1963 | Kosonocky et al. | 307—88 |

OTHER REFERENCES

Pages 110–115, April 4, 1959—Publication: The Parametron—An Amplifying Logic Element, Control Engineering.

Pages 73–78, June 3, 1960—Publication II: "Parametron Computer Circuits," Electronics.

April 1957—"Multiple Frequency Type Magnetic Amplifier Oscillator" by Harada, Proc. Joint Conference of Four Electric Institutes—Japan.

IRVING L. SRAGOW, *Primary Examiner.*

STEPHEN W. CAPELLI, WALTER W. BURNS, Jr., *Examiners.*